United States Patent [19]

Omata et al.

[11] Patent Number: 4,923,378
[45] Date of Patent: May 8, 1990

[54] MOLD ASSEMBLY FOR MOLDING AUTOMOTIVE SEAT

[75] Inventors: Youichi Omata; Ichiro Matsuura; Kiichiro Ishimaru; Hisayoshi Mizuno, all of Kanagawa, Japan

[73] Assignee: Ikeda Bussan Co., Ltd., Ayase, Japan

[21] Appl. No.: 284,355

[22] Filed: Dec. 14, 1988

[30] Foreign Application Priority Data

Feb. 24, 1988 [JP] Japan ................. 63-22348[U]

[51] Int. Cl.$^5$ .............................................. B28B 7/30
[52] U.S. Cl. ..................... 425/4 R; 249/124; 249/142; 249/178; 249/180; 425/577; 425/817 R
[58] Field of Search ............. 425/577, DIG. 58, 14 R, 425/817 R, 388, DIG. 48; 249/151, 177, 178, 124, 125, 196, 165, 63, 91.96, 147, 142, 180; 264/46.4, 46.6, 46.8

[56] References Cited

U.S. PATENT DOCUMENTS

| | | | |
|---|---|---|---|
| 3,819,099 | 6/1974 | Bierenfeld | 226/91 |
| 4,157,806 | 7/1979 | Bourdon et al. | 294/184 |
| 4,455,274 | 6/1984 | Horney | 264/262 |
| 4,470,784 | 9/1984 | Piotrovsky | 425/116 |
| 4,532,093 | 6/1985 | O'Malley et al. | 264/40.1 |
| 4,587,074 | 5/1986 | De Loof | 264/516 |
| 4,737,096 | 4/1988 | Poorten | 425/190 |
| 4,738,809 | 4/1988 | Storch | 264/46.6 |

FOREIGN PATENT DOCUMENTS 0210587 4/1987 European Pat. Off. .
2534848 12/1981 France .

*Primary Examiner*—Jay H. Woo
*Assistant Examiner*—K. P. Nguyen
*Attorney, Agent, or Firm*—Foley & Lardner, Schwartz, Jeffery, Schwaab, Mack, Blumenthal & Evans

[57] ABSTRACT

Disclosed herein is a mold assembly for molding a plastic article having a recess formed therein. The mold assembly includes a lower mold having a cavity formed therein; an upper mold adapted to be put on the lower mold to close the cavity; a core adapted to be put in the cavity; positioning means including a first member connected to a given portion of the cavity of the lower mold and a second member connected to the core, the first and second members being coupled when mated; and guide means for guiding the core in a manner to facilitate the mating of the second member with the first member.

5 Claims, 2 Drawing Sheets

MOLD ASSEMBLY FOR MOLDING AUTOMOTIVE SEAT

BACKGROUND OF THE INVENTION

1. Field of the Invention

The present invention relates in general to a mold assembly for molding an automotive seat, and more particularly to a mold assembly for molding an automotive seat which is formed with holes for inserting thereinto holding pins of a headrest. More specifically, the present invention is concerned with a mold assembly which is designed to achieve an exact die matching.

2. Description of the Prior Art

In order to clarify the task of the present invention, one of conventional mold assemblies of the above-mentioned type will be described with reference to FIGS. 4 and 5.

FIG. 4 shows a backrest pad 1 of an automotive seat, which is molded by means of the conventional mold assembly as shown in FIG. 5. The backrest pad 1 is molded from foamed polyurethane and constructed to have at a back side thereof a large rectangular recess 1b for setting therein a frame structure (not shown). The pad 1 has at its upper side an overhang portion 1a projected toward a lower side of the pad. The upper side of the pad 1 is formed with two holes 1c and 1c which extend to the recess 1b.

Although not shown in the drawings, a rectangular frame structure is put into the recess 1b to constitute a structural base of the backrest. The frame structures have two cylindrical holders mated with the holes 1c and 1c of the pad 1. An outer skin member covers the pad 1 and a back garnish covers a back side of the pad 1.

The mold assembly for molding the backrest pad 1 comprises, as shown in FIG. 5, generally two major parts which are a lower mold 2 having a cavity formed therein, an upper mold 3 adapted to be put on the lower mold 2, and a core 4 adapted to be put in the cavity of the lower mold 2. The core 4 has an outer shape in coincidence with the shape of the recess 1b of the molded pad 1. A pair of projections 2a are provided on a given portion of the inner side of the lower mold 2, and a pair of tubular portions 4a are integrally formed on the core 4. Upon proper assembly, the lower mold 2 receives therein the core 4 having the projections 2a neatly received in the tubular portions 4a.

A foamable material, such as a material for foamed polyurethane or the like, is poured into a clearance defined in the cavity about the core 4 and cured for a given time. After hardening of the material, the upper mold 3 and the core 4 are removed from the lower mold 2. With this, the backrest pad 1 is produced, which has two holes 1c and 1c produced by the mated projections 2a and the tubular portions 4a.

However, the above-mentioned mold assembly has the following drawback due to its inherent construction.

That is, the work for properly setting the core 4 in the lower mold 2 should be made by moving the core 4 awkwardly axially, laterally and vertically in the mold 2 for achieving coupling of the tubular portions 4a with the projections 2a. In other words, an operator has to work blindly to couple the tubular portions 4a with the projections 2a. Obviously, this is very troublesome and difficult.

SUMMARY OF THE INVENTION

It is therefore an object of the present invention to provide an improved mold assembly which is free of the above-mentioned drawback.

According to the present invention, there is provided a mold assembly which is designed to faciliate the work for achieving a die matching.

According to the present invention, there is provided a mold assembly for molding a plastic article having a recess formed therein. The mold assembly comprises a lower mold having a cavity formed therein; an upper mold adapted to be put on the lower mold to close the cavity; a core adapted to be put in the cavity; positioning means including a first member connected to a given portion of the cavity of the lower mold and a second member connected to the core, the first and second members being coupled when mated; and guide means for guiding the core in a manner to facilitate the mating of the second member with the first member

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
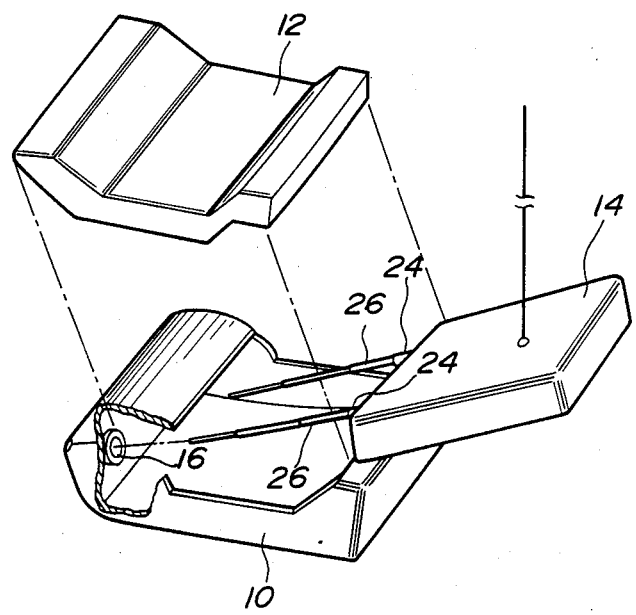
FIG. 1 is a partially cut perspective view of a mold assembly according to the present invention.
Figure 2:
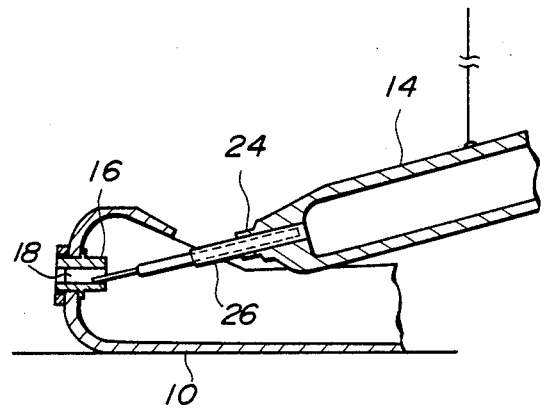
FIG. 2 is a sectional, but partial, view of the mold assembly showing a condition wherein a core is about to be set in a lower mold.
Figure 3:
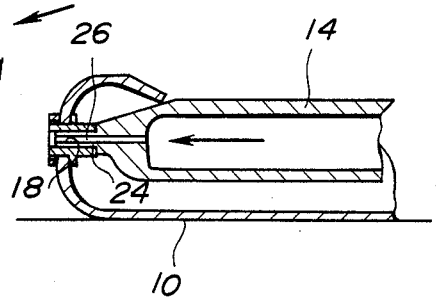
FIG. 3 is a view similar to FIG. 2, but showing a condition wherein the core is properly set in the lower mold.
Figure 4:
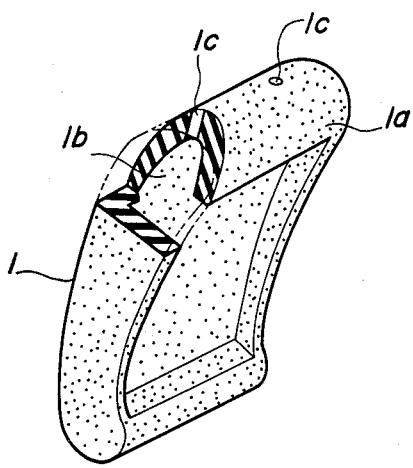
FIG. 4 is a partially cut perspective view of a backrest pad which is produced by means of the mold assembly.

Referring to FIGS. 1 to 3, particularly FIG. 1, there is shown a mold assembly according to the present invention.

In the drawings, denoted by numeral 10 is a lower mold having a cavity formed therein. Denoted by numeral 12 is an upper mold which is adapted to be put on the lower mold 10 to close the cavity. Denoted by numeral 14 is a core which is adapted to be set in the lower mold 10. Thus, the major three parts of the mold assembly of the invention are similar in construction to those of the aforementioned conventional assembly.

However, in the invention, a unique measure is employed which is as follows.

As is best seen from FIG. 2, a pair of tubular members 16 are tightly connected to the lower mold 10 with their inboard open ends exposed to the cavity of the lower mold 10. Each tubular member 16 has a blind bore 18 defined therein.

The core 14 is of a hollow member and has at its one end two apertured cylindrical portions 24. The cylindrical portions 24 are sized and constructed to be snugly received in the blind bores 18 of the tubular members 16.

Each apertured cylindrical portion 24 holds therein a telescopically expandable antenna pin 26.

In order to mold a backrest pad 1 by using the mold assembly of the present invention, the following steps are carried out.

First, the antenna pins 26 are fully expanded from the core 14. Then, as is shown in FIG. 2, the core 14 is carried into the lower mold 10 having the leading ends of the expanded antenna pins 26 put into blind bores 18 of the tubular members 16. During insertion of the core 14 into the lower mold 10, the antenna pins 26 are gradually retracted into the base portions of the pins 26, and finally, with the core 14 moved toward the tubular members 16, the cylindrical portions 24 are neatly received in the blind bores 18 accomplishing the setting of the core 14 in the lower mold 10. Under this condition, the core 14 is positioned with respect to the lower mold 10 leaving a given space between the core 14 and the lower mold 10, as is understood from FIG. 3.

Then, the upper mold 12 is properly put on the lower mold 10 and fastened to the same by means of a known clamping device (not shown). Then, a material for foamed polyurethane is poured into the cavity of the mold assembly thus assembled, and then the material is cured in a known manner. After hardening of the material, the upper mold 12 and the core 14 are removed from the lower mold 10 for taking out the product, viz., the backrest pad 1, from the mold 10.

Figure 5:
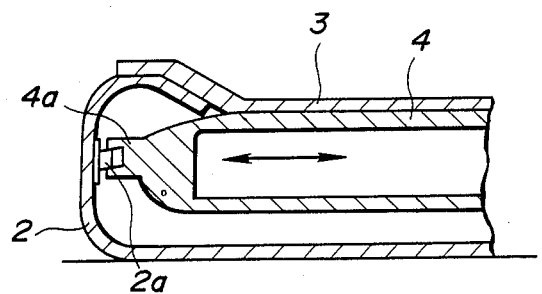
FIG. 5 is a view similar to FIG. 3, but showing a conventional mold assembly.

As is described hereinabove, the antenna pins 26 serve as a guide means for guiding the core 14 to the proper set position in the lower mold 10. Thus, the assembly work of the mold assembly is quite simplified as compared with the case of the aforementioned conventional assembly of FIG. 5.

What is claimed is:

1. A mold assembly for molding a plastic article having a recess formed therein, said mold assembly comprising:
   a lower mold having a cavity formed therein;
   an upper mold adapted to be put on said lower mold to close said cavity;
   a core adapted to be placed in said cavity;
   positioning means, including a first member connected to a given portion of the cavity of the lower mold and a second member connected to said core, said first and second members being coupled when mated; and
   a telescopically collapsible pin having a base portion held by said second member and a leading end engageable with said first member, said pin guiding the insertion of the second member into the first member.

2. A mold assembly as claimed in claim 1, in which said first and second members of said positioning means are female and male members respectively.

3. A mold assembly as claimed in claim 2, in which said first member is a tubular member which is connected to said lower mold having its inboard open end exposed said cavity of the lower mold, and in which said second member is a cylindrical portion integrally formed on a given portion of said core, said cylindrical portion being so sized and constructed to as to be snugly received in said tubular member.

4. A mold assembly as claimed in claim 3, in which said base portion of said antenna pin is tightly held in a bore formed in said cylindrical portion of said core.

5. A mold assembly for molding a plastic article having a recess formed therein, said mold assembly comprising:
   a lower mold having a cavity formed therein;
   an upper mold adapted to be put on said lower mold to close said cavity;
   a core adapted to be placed in said cavity;
   two tubular members each being connected to said lower mold with its open end exposed to said cavity;
   two cylindrical portions, each being integrally formed on said core and sized to be snugly received in said tubular member, each cylindrical portion having a bore formed therein; and
   two telescopically expandable and collapsible antenna pins each being held by said bore of the cylindrical portion, the antenna pins collapsing as they guide the core into an assembled molding configuration with the lower mold.

* * * * *